Patented Mar. 16, 1948

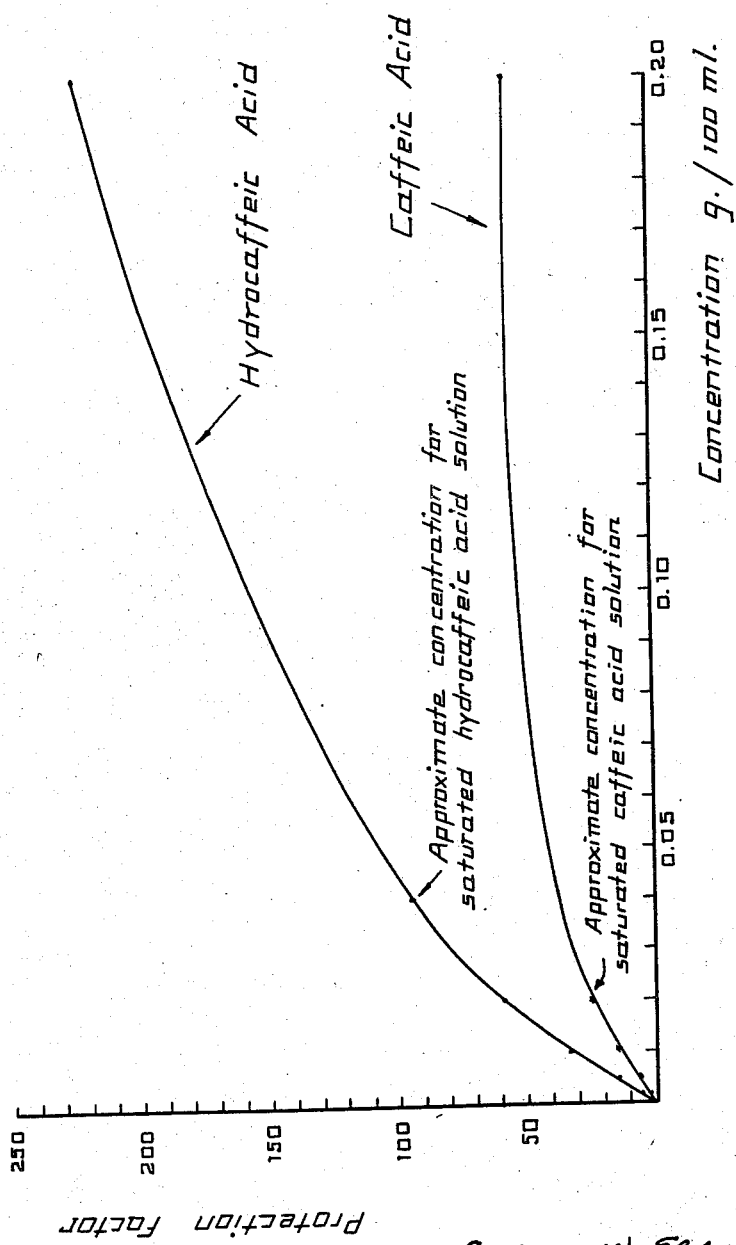

2,437,731

UNITED STATES PATENT OFFICE 2,437,731

HYDROCAFFEIC ACID AND ESTERS AS ANTIOXIDANTS

Lucius W. Elder, Madison, and Harold S. Levenson, Orange, N. J., assignors to General Foods Corporation, New York, N. Y., a corporation of Delaware Application January 29, 1945, Serial No. 575,132

12 Claims. (Cl. 260—398.5)

This invention relates to the preservation or stabilization of animal and vegetable fats and oils, and of products containing the same, against deleterious oxidative changes.

It is well known that animal and vegetable oils and fats often undergo oxidative deterioration upon standing in contact with air which leads to the development of undesirable tastes and odors, as, for example, those commonly associated with rancidity. In the case of food products containing edible oils and fats, for example, such deterioration often renders the product unfit for human consumption. This deterioration is attributed to the fact that some of the constituents of these fats and oils possess a tendency to absorb oxygen which apparently first reacts with unsaturated constituents to form peroxides. It is generally believed to be the function of an antioxidant to delay the accumulation of such peroxides and thus halt the production of the various final oxidation products or at least retard it until the oils and fats can be utilized.

In accordance with the invention, the deterioration of animal and vegetable fats and oils is prevented or at least greatly retarded by the incorporation therein of small amounts of hydrocaffeic acid or certain esters thereof. Hydrocaffeic acid is the saturated derivative of caffeic acid which results from the addition of two atoms of hydrogen to the double bond of the side chain.

Various polyhydroxy phenols have been found in the past to have antioxygenic activity, the ortho and para polyhydroxy compounds such as hydroquinone and catechol being more effective than the corresponding meta compounds such as resorcinol. Caffeic acid, which is a derivative of the former type, is also known to have antioxygenic activity of a high order, and it has been thought that this activity is due in part to the presence in the side chain of the unsaturated double bond between the catechol nucleus and the carboxyl group. It now appears that this is not the case and that the activity of caffeic acid is due primarily to its hydroxy grouping. On the contrary, we have discovered that hydrocaffeic acid, in which the side chain is saturated, is much more effective than caffeic acid, being from one and a half to three times as effective in substrates such as lard, cod liver oil, peanut oil, olive oil, and citrus oils.

This greater effectiveness of hydrocaffeic acid is illustrated by the following comparison with caffeic acid. When an oxidizable oil or fat is exposed to oxygen or air under standardized conditions, a definite time interval termed the "induction period" elapses before there is an appreciable absorption of oxygen by the oil or fat, and the effectiveness of an antioxidant can be measured in terms of its ability to prolong the induction period. This measurement can be carried out conveniently with a Barcroft-Warburg apparatus in comparison with a control, the effectiveness of the antioxidant being generally expressed numerically as a "protection factor" which is the ratio of the induction period for the stabilized oil or fat to that for the control, i. e., the untreated oil or fat.

The following data were obtained by the aforementioned method and apparatus, the fats and oils being mechanically shaken in an atmosphere of oxygen, and the citrus oils being maintained at 60° C. while the rest were maintained at 90° C.

Table I

| Substrate | Control (No Antioxidant) I. P.[1] hrs. | Antioxidant (0.02 g./100 ml.) | | | |
|---|---|---|---|---|---|
| | | Caffeic Acid | | Hydrocaffeic Acid | |
| | | I. P., hrs. | P. F.[2] | I. P., hrs. | P. F. |
| Corn Oil | 17.4 | 29.6 | 1.70 | 29.6 | 1.70 |
| Shortening[3] | 108 | 174 | 1.61 | 193 | 1.79 |
| Wheat Germ Oil | 9.0 | 15.6 | 1.70 | 17.5 | 1.90 |
| Cottonseed Oil | 17.1 | 30.8 | 1.80 | 35.3 | 2.06 |
| Cod Liver Oil | 0.62 | 0.70 | 1.13 | 2.18 | 3.52 |
| Peanut Oil | 28.8 | 78.8 | 2.74 | 114.3 | 3.97 |
| Butter Oil | 30.6 | 188 | 6.15 | 318 | 10.4 |
| Refined Cocoa Butter | 16.4 | 243 | 14.8 | 310 | 18.9 |
| Olive Oil | 6.53 | 73.6 | 11.3 | 128 | 19.6 |
| Lard | 3.96 | 103.3 | 24.5 | 219 | 59.5 |
| Lemon Oil | 14.9 | 24.3 | 1.63 | 35.5 | 2.38 |
| Orange Oil | 2.46 | 16.8 | 6.83 | 32.5 | 13.2 |

[1] Induction Period.
[2] Protection Factor.
[3] A commercial hydrogenated shortening known as "XXXVream."

A comparison of P. F. values shows the most pronounced superiority of hydrocaffeic acid over caffeic acid with cod liver oil and lard, and a less marked but still large superiority with the citrus oils, olive oil, butter oil, peanut oil, and refined cocoa butter.

The protection factors in the other four cases do not show such striking improvement, in accordance with common experience that most antioxidants do not give high protection factors in vegetable oils, but the absolute differences in I. P. values are also to be considered and the increase of 19 hrs. effected with the hydrogenated shortening, for example, is of considerable practical significance.

In addition to the greater effectiveness of hydrocaffeic acid as illustrated by the above data, there is a qualitative difference in the solubility of caffeic and hydrocaffeic acids in fats and oils which is of great practical advantage. This advantage is illustrated by Table II, which shows the increasing antioxidant protection afforded by increasing amounts of caffeic and hydrocaffeic acids in lard at 90° C.

Table II

| Substrate, Lard Concentration, g./100 ml. | Antioxidant | | | |
|---|---|---|---|---|
| | Caffeic Acid | | Hydrocaffeic Acid | |
| | I. P., hrs. | P. F. | I. P., hrs. | P. F. |
| Control, No Antioxidant | 4.23 | | 3.68 | |
| .001 | 7.8 | 1.84 | | |
| .002 | 10.7 | 2.53 | 16.1 | 4.41 |
| .005 | 28.3 | 6.68 | 52.5 | 14.3 |
| .01 | 61.5 | 14.5 | 116.4 | 31.6 |
| .02 [1] | 103.3 | 24.5 | 219 | 59.5 |
| .04 [2] | | | 346 | 94.1 |
| .2 | 125.5 | [3] 55.8 | 499 | [3] 222 |

[1] Approximate concentration for saturated caffeic acid solution at 90° C.
[2] Approximate concentration for saturated hydrocaffeic acid solution at 90° C.
[3] Induction period for control=2.25.

The greater quantity of hydrocaffeic acid that can be dissolved in the lard (0.04%) provides a degree of protection almost four times as great as that obtainable with the maximum concentration of caffeic acid (0.02%). The same is qualitatively true with other fats and oils. Thus the superiority of hydrocaffeic acid over caffeic acid at the same concentration, as demonstrated by Table I, is enhanced in view of the greater amount that can be dissolved in the fat or oil. Moreover, where dispersed or undissolved antioxidant is not objectionable and the amounts used are increased beyond the saturation values, the superiority of hydrocaffeic acid is not only maintained but increased as illustrated at the concentration of 0.2 g./100 ml. These relationships are illustrated by the curves in the drawing.

Hydrocaffeic acid can be used for the stabilization of fatty substances and oils of both animal and vegetable origin which are subject to oxidiative deterioration upon standing in contact with air, as well as food products and other materials containing them. Among these fatty substances and oils may be mentioned by way of example fatty acids and fatty acid soaps, glyceride fats and oils, the terpene-containing essential oils, etc. Lard in particular is an example of an animal fat which tends to turn rancid. Vegetable fats and oils such as cottonseed oil, coconut oil, corn oil, wheat germ oil, soy bean oil, peanut oil, refined cocoa butter, olive oil, orange oil, lemon oil, etc., may be treated with hydrocaffeic acid and their keeping qualities improved, particularly since such vegetable fats and oils are often subjected to refining operations which remove some naturally occurring antioxidants. Shortenings of the dry plastic type comprising partially hydrogenated refined vegetable oils, and similar shortenings produced by compounding an oil with a hard fat, may likewise be stabilized by the invention. Hydrocaffeic acid is also well suited for use in food products containing such fatty substances and oils such as bakery products, oil-bearing nuts and fruits, fruit juices, etc.

The invention is not restricted to the use of hydrocaffeic acid per se but includes also the use of certain derivatives which exhibit similar antioxygenic activity, in particular, the esters of hydrocaffeic acid with alkyl alcohols (monohydric saturated aliphatic alcohols, which may be straight or branched-chain primary, secondary, or tertiary alcohols). The following Table III illustrates the effectiveness of some of these esters, namely, esters of hydrocaffeic acid with normal primary alcohols ranging from one to twelve carbon atoms, in lard at 90° C. Also shown in Table III is the comparative effectiveness afforded by the corresponding esters of caffeic acid under the same conditions. The values shown in the two right-hand columns for equimolar concentrations of the different esters are calculated on the assumption that the protection factors for the esters of the two acids vary with concentration in the same manner as those for the acids.

Table III

| Ester | Antioxidant in Lard At Concentration of 0.02 g./100 ml. | | | | P. F. Calculated for Equimolar Concentrations Corresponding to 0.02 g. Acid/100 ml. | |
|---|---|---|---|---|---|---|
| | Caffeate | | Hydrocaffeate | | Caffeate P. F. | Hydrocaffeate P. F. |
| | I. P., hrs. | P. F. | I. P., hrs. | P. F. | | |
| Control, No Antioxidant | 3.60 | | 3.60 | | | |
| Acid [1] | 103.3 | 24.5 | 219 | 59.5 | 24.5 | 59.5 |
| Methyl | 88.6 | 24.6 | 135.2 | 37.6 | 26.0 | 39.6 |
| Ethyl | 78.2 | 21.7 | 119.8 | 33.3 | 24.0 | 37.6 |
| Butyl | 74.5 | 20.7 | 101.4 | [2] 29.0 | 25.1 | 36.5 |
| Octyl | 57.1 | [2] 16.3 | | | 23.8 | |
| Lauryl | 50.6 | 14.1 | 79.5 | 22.1 | 23.8 | 39.0 |
| Average [3] | | | | | 24.5 | 38.2 |

[1] Value for the acids from Table II.
[2] Control=3.50 hrs.
[3] Excluding the values for the acids.

It will be seen from the above figures that on a molar basis, there is a remarkable uniformity in the protection factors for caffeic acid and for its esters, indicating that the antioxidant effect of these compounds is due primarily to the 3,4 hydroxyl groups. A similar uniformity is observed with esters of hydrocaffeic acid, but at a higher level of effectiveness than is obtained with caffeic acid and its esters. This increased effectiveness is attributed to the different manner in which the saturated and unsaturated side chains affect the reactivity of the catechol nucleus as stated above. In the case of hydrocaffeic acid per se, however, it is evident that some other effect is obtained in view of the sharp increase in effectiveness of this acid as compared with its esters, and it is believed that in hydrocaffeic acid with its saturated side chain, there is a synergistic action between the dihydroxy grouping and the carboxyl group which is absent in caffeic acid where the side chain is unsaturated.

The above theoretical considerations are offered as the best available explanation of the effectiveness of hydrocaffeic acid and its esters, and although the chemistry involved in the use of these antioxidants is not fully understood, this explanation is believed to be correct. Whatever the true explanation may be, however, tests such as those set forth above demonstrate that hydrocaffeic acid and its esters do possess antioxygenic activity of a high order.

The antioxidants of the present invention can be added to or mixed with the fat or oil in any suitable or known manner. The amount to be used is not critical, but in general only a very small amount of the order of a small fraction of a percent will be all that is needed. On the other hand, there is no reasonable minimum which will not yield some result. Hence it will be understood that the invention is not restricted to the details of the foregoing description, and that reference should be had to the appended claims for a definition of its limits.

What is claimed is:

1. A process of stabilizing fats, fatty acids, fatty acid derivatives and oils of animal and vegetable origin against oxidative deterioration which comprises adding thereto a material selected from the group consisting of hydrocaffeic acid and alkyl esters thereof.

2. A process of stabilizing glyceride fats and oils against oxidative deterioration which comprises adding thereto a material selected from the group consisting of hydrocaffeic acid and alkyl esters thereof.

3. A process of stabilizing essential oils against oxidative deterioration which comprises adding thereto a material selected from the group consisting of hydrocaffeic acid and alkyl esters thereof.

4. A process of stabilizing fats, fatty acids, fatty acid derivatives and oils of animal and vegetable origin against oxidative deterioration which comprises adding hydrocaffeic acid thereto.

5. A process of stabilizing glyceride fats and oils against oxidative deterioration which comprises adding hydocaffeic acid thereto.

6. A process of stabilizing essential oils against oxidative deterioration which comprises adding hydrocaffeic acid thereto.

7. A composition of matter stabilized against oxidative deterioration and containing a material of the group consisting of fats, fatty acids, fatty acid derivatives and oils of animal and vegetable origin and a member of the group consisting of hydrocaffeic acid and alkyl esters thereof.

8. A composition of matter stabilized against oxidative deterioration and containing a glyceride oil or fat and a member of the group consisting of hydrocaffeic acid and alkyl esters thereof.

9. A composition of matter stabilized against oxidative deterioration and containing an essential oil and a member of the group consisting of hydrocaffeic acid and alkyl esters thereof.

10. A composition of matter stabilized against oxidative deterioration and containing a material of the group consisting of fats, fatty acids, fatty acid derivatives and oils of animal and vegetable origin and hydrocaffeic acid.

11. A composition of matter stabilized against oxidative deterioration and containing a glyceride oil or fat and hydrocaffeic acid.

12. A composition of matter stabilized against oxidative deterioration and containing an essential oil and hydrocaffeic acid.

LUCIUS W. ELDER.
HAROLD S. LEVENSON.

REFERENCES CITED

The following references are of record in the file of this patent:

UNITED STATES PATENTS

| Number | Name | Date |
| --- | --- | --- |
| 2,333,657 | Mattill et al. | Nov. 9, 1943 |